US012113421B2

(12) United States Patent
Wang et al.

(10) Patent No.: US 12,113,421 B2
(45) Date of Patent: Oct. 8, 2024

(54) MOTOR, POWERTRAIN, AND VEHICLE

(71) Applicant: Huawei Digital Power Technologies Co., Ltd., Shenzhen (CN)

(72) Inventors: Ke Wang, Xi'an (CN); Shenghai Jiang, Xi'an (CN); Lang Lv, Xi'an (CN); Zhiqi Wei, Xi'an (CN); Guojie Xu, Xi'an (CN); Senlin Ma, Shanghai (CN); Wenwu Ma, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 17/457,390

(22) Filed: Dec. 2, 2021

(65) Prior Publication Data

US 2022/0209616 A1 Jun. 30, 2022

(30) Foreign Application Priority Data

Dec. 8, 2020 (CN) ......................... 202011444829.2

(51) Int. Cl.
| F16C 19/06 | (2006.01) |
| F16C 35/077 | (2006.01) |
| H02K 5/173 | (2006.01) |
| B60K 1/00 | (2006.01) |

(52) U.S. Cl.
CPC ........... *H02K 5/1732* (2013.01); *F16C 19/06* (2013.01); *F16C 35/077* (2013.01); *B60K 2001/001* (2013.01)

(58) Field of Classification Search
CPC ..... H02K 5/1732; F16C 19/06; F16C 35/077; B60K 2001/001

USPC ........................................................... 310/90
See application file for complete search history.

(56) References Cited

U.S. PATENT DOCUMENTS

| 4,515,417 A | 5/1985 | Shiraishi |
| 5,914,547 A | 6/1999 | Barahia et al. |
| 2016/0201761 A1* | 7/2016 | Kwon ................. F16D 3/68 |
| | | 74/425 |

FOREIGN PATENT DOCUMENTS

| CN | 202889117 U | 4/2013 |
| CN | 103516143 A | 1/2014 |
| CN | 104607729 A | 5/2015 |
| CN | 104821691 A | 8/2015 |
| CN | 208112344 U | 11/2018 |
| CN | 109194039 A | 1/2019 |

(Continued)

*Primary Examiner* — Terrance L Kenerly
(74) *Attorney, Agent, or Firm* — WOMBLE BOND DICKINSON (US) LLP

(57) ABSTRACT

This application describes a motor that includes a housing, an output shaft, a conductive bearing, and a conductive component. The output shaft is disposed in the housing. A positioning hole is disposed on an end face of a first end of the output shaft, and the positioning hole is disposed coaxially with the output shaft. The conductive bearing is disposed in the positioning hole, and includes an inner ring, and an outer ring that is fixedly connected to the output shaft. One end of the conductive component is fixedly connected to the inner ring of the conductive bearing, and the other end is connected to the housing. In this application, the motor can output, by using the conductive bearing and the conductive component, charges accumulated in the output shaft, to eliminate a generated common-mode voltage.

16 Claims, 6 Drawing Sheets

(56) References Cited

FOREIGN PATENT DOCUMENTS

| | | |
|---|---|---|
| CN | 211351908 U | 8/2020 |
| CN | 111795068 A | 10/2020 |
| CN | 211791039 U | 10/2020 |
| CN | 211827004 U | 10/2020 |
| CN | 211859879 U | 11/2020 |
| CN | 112572144 A | 3/2021 |
| DE | 10162818 A1 | 6/2003 |
| DE | 102012204795 A1 | 9/2013 |
| EP | 2736153 A2 | 5/2014 |
| EP | 3148057 A1 | 3/2017 |
| JP | S5981254 U | 6/1984 |
| JP | 2001140911 A | 5/2001 |
| JP | 2018194106 A | 12/2018 |

\* cited by examiner

MOTOR, POWERTRAIN, AND VEHICLE

CROSS-REFERENCE TO RELATED APPLICATIONS

This application claims priority to Chinese Patent Application No. 202011444829.2, filed on Dec. 8, 2020, which is hereby incorporated by reference in its entirety.

TECHNICAL FIELD

This application relates to the field of motor technologies, and in particular, to a motor, a powertrain, and a vehicle.

BACKGROUND

With continuous innovation of technologies, a vehicle gradually develops towards electrification. In a process in which the vehicle develops towards electrification, requirements on an energy density of a transmission system and an input voltage of a motor continuously demanding. As a result, charges accumulated in a motor rotor continuously increase, and the charges flow from an output shaft of the motor to a bearing configured to support the output shaft. Consequently, the bearing is electrically corroded.

SUMMARY

This application provides a motor that can output, by using a conductive bearing, charges accumulated in a motor rotor, to prevent a bearing configured to support an output shaft from being electrically corroded.

According to a first aspect, this application provides a motor. The motor includes a housing, an output shaft, a conductive bearing, and a conductive component. The output shaft is disposed in the housing. A positioning hole is disposed on an end face of a first end of the output shaft, and the positioning hole is disposed coaxially with the output shaft. The conductive bearing is disposed in the positioning hole, and includes an inner ring, and an outer ring that is fixedly connected to the output shaft. One end of the conductive component is fixedly connected to the inner ring of the conductive bearing, and the other end is connected to the housing.

In the foregoing solution, when the motor works, the output shaft of the motor may drive the outer ring, that is of the conductive bearing and that fits with the output shaft, to rotate, and the inner ring of the conductive bearing is still relative to the outer ring of the conductive bearing. Therefore, the conductive component does not rotate with rotation of the outer ring of the conductive bearing, thus ensuring mounting stability of the conductive component. In this way, when a common-mode voltage generated during running of a motor rotor in the motor passes through the output shaft, accumulated charges may be transferred from the conductive bearing and the conductive component to ground, to prevent a bearing configured to support the output shaft from being electrically corroded.

It should be noted that, to ensure that the charges accumulated in a running process of the motor rotor are output by using the conductive bearing and the conductive component, the output shaft may be positioned in the housing by using a load bearing, and a resistance of the load bearing is greater than a sum of resistances of the conductive bearing and the conductive component. In this way, when the common-mode voltage generated during running of the motor rotor in the motor passes through the output shaft, the accumulated charges may be transferred from the conductive bearing and the conductive component that have a smaller sum of resistances to the ground, to output the accumulated charges by using the conductive bearing and the conductive component.

In an embodiment, the conductive component may include a conductive pillar and a conductive sheet, one end of the conductive pillar is fixedly connected to the inner ring of the conductive bearing, the other end of the conductive pillar may be connected to the conductive sheet, the conductive sheet is connected to the housing, and the conductive pillar is fixedly connected to the housing by using the conductive sheet. When the motor works, the output shaft may drive the outer ring, that is of the conductive bearing and that fits with the output shaft, to rotate, and the inner ring of the conductive bearing is still relative to the outer ring of the conductive bearing. Therefore, the conductive pillar and the conductive sheet connected to the conductive pillar do not rotate with rotation of the outer ring of the conductive bearing, and mounting stability of the conductive pillar and the conductive sheet is ensured. In this way, the charges accumulated during running of the motor rotor may be transferred from the conductive bearing to the conductive pillar, and then transferred from the conductive sheet to the housing for grounding, to implement charge output, and prevent the bearing configured to support the output shaft from being electrically corroded.

It should be noted that, to ensure that the charges can be transferred from the output shaft to the conductive bearing, the outer ring of the conductive bearing is coupled to the output shaft, so that switching between rotation and stillness can be implemented, and the charge can further be stably transferred. In addition, to ensure that the charge can be stably transferred from the conductive bearing to the conductive pillar, the conductive pillar may fit with the inner ring of the conductive bearing through interference. In this way, an outer diameter of the conductive pillar is coupled to the inner ring of the conductive bearing, so that the conductive pillar can always be in contact with the conductive bearing.

In an embodiment, the conductive sheet may include a first connection sheet and a second connection sheet that are connected to each other, where the first connection sheet is further connected to the housing, and the second connection sheet is further clamped to the other end of the conductive pillar. There may be one, two, or more first connection sheets. When there are two first connection sheets, the two first connection sheets may be disposed at an angle, one end of the second connection sheet may be connected to a position at which the two first connection sheets are connected to each other, and the other end of the second connection sheet extends to a position of the conductive pillar and is clamped to the other end of the conductive pillar.

To facilitate mounting of the first connection sheet on the housing, the first connection sheet may include an arch-shaped part and a first connection part, the first connection part is connected to one end of the arch-shaped part, the other end of the arch-shaped part is connected to the second connection sheet, and a first mounting hole may be disposed on the first connection part. When the first connection sheet is connected to the housing, a bolt passes through the first mounting hole to be connected to the housing, so that the first connection sheet is fastened to the housing. With disposition of the arch-shaped part, the first connection sheet can be adapted to a shape of the housing to improve mounting convenience. There may be one, two, or more first mounting holes.

It should be noted that the conductive sheet may be an integral structure, or may be a separate structure. When the conductive sheet is an integral structure, the first connection sheet and the second connection sheet are integrally disposed. When the conductive sheet is a separate structure, the first connection sheet and the second connection sheet may be connected to each other in a manner of a bolt or clamping.

In an embodiment, a groove may be further disposed on the conductive pillar, and an opening of the groove faces a side of the conductive sheet. An insertion part that can be inserted into the groove is disposed on the second connection sheet, and the insertion part is connected to the first connection sheet by using a second connection part. The insertion part and the second connection part may be disposed at an angle. In other words, the insertion part and the second connection part may be disposed in a bending shape, and a specific bending angle needs to be adjusted based on actual mounting, so that the second connection sheet fits with the groove on the conductive pillar.

It should be noted that, a distance by which the groove extends to an end away from the conductive sheet needs to reach at least a position at which the conductive pillar fits with the inner ring of the conductive bearing through interference. Therefore, when the conductive pillar fits with the inner ring of the conductive bearing through interference, the conductive pillar on two sides of the groove may be deformed towards a center of the groove, so that extrusion force exerted on the inner ring of the conductive bearing is reduced, and the inner ring of the conductive bearing or the conductive pillar is prevented from being damaged. In addition, a plurality of grooves may be disposed at intervals, and a distance by which at least one groove in the plurality of grooves extends to an end away from the conductive sheet needs to reach at least the position at which the conductive pillar fits with the inner ring of the conductive bearing through interference.

In an embodiment, to connect the conductive pillar to the conductive sheet, a through hole and a second mounting hole may be further disposed on the conductive sheet, a thread is disposed on an outer surface of an end of the conductive pillar that is away from the conductive bearing, and a mounting base is disposed below a part of the conductive pillar that is provided with the thread. When the conductive pillar passes through the through hole, a nut fits with the thread on the outer surface of the conductive pillar to press the conductive sheet against the mounting base, and a bolt passes through the second mounting hole to fasten the conductive sheet to the housing. In addition, the outer surface of the conductive pillar that is away from the conductive bearing may be a smooth surface, and a nut or another fastener fits with this part through interference, to press the conductive sheet against the mounting base.

The conductive sheet may include one or more connection arms. When the conductive sheet includes one connection arm, a second mounting hole may be disposed at an end of the connection arm, a through hole may be disposed at any position other than the second mounting hole on the connection arm, and there may be more than one through hole and more than one second mounting hole. When the conductive sheet includes two connection arms and the two connection arms are integrally disposed, at least one second mounting hole may be disposed on each connection arm, and a through hole may be disposed at a part at which the two connection arms are connected, or may be disposed on one of the connection arms, or a through hole may be disposed on each of the two connection arms, so that the conductive pillar is connected to the conductive sheet. In addition, when the two connection arms included in the conductive sheet are separately disposed, a second mounting hole and a through hole are disposed on each connection arm. When the conductive pillar is connected to the two connection arms, the conductive pillar may pass through the through holes on both of the two connection arms, so that the conductive pillar can be connected to both of the two connection arms.

It should be noted that, when the conductive sheet includes two connection arms, a projection of the two connection arms on a horizontal plane may be a rectangle, or may be a V-shape or another curved shape, provided that the conductive sheet can be connected to the housing.

To ensure that the conductive pillar fits with the inner ring of the conductive bearing, the inner ring of the conductive bearing may be connected to the conductive pillar through interference, so that sliding friction is prevented from occurring due to slipping, a reliable connection is implemented, and small extrusion force is exerted on the inner ring of the conductive bearing. An opening may be disposed on a side of the conductive pillar that faces away from the conductive sheet, the opening penetrates through the conductive pillar in a radial direction of the conductive pillar, and the opening is located at a position at which the conductive pillar fits with the inner ring of the conductive bearing through interference. Therefore, when the conductive pillar fits with the inner ring of the conductive bearing through interference, parts on two sides of the opening on the conductive pillar may be close to an axis position of the conductive pillar, to ensure that small extrusion force is exerted on the inner ring of the conductive bearing when the conductive pillar fits with the inner ring of the conductive bearing through interference. This improves a service life of the inner ring of the conductive bearing.

In the foregoing embodiment, the motor may further include an end cover. When the conductive sheet is connected to the housing, a part at which the conductive sheet is connected to the housing is located on an outer side of the housing. After the conductive sheet is connected to the housing, the end cover is connected to the housing, to improve connection precision of the conductive sheet and avoid blind assembling.

In the foregoing embodiment, the conductive sheet may be disposed as an elastic sheet. Therefore, when the conductive sheet is connected to the housing and the conductive pillar, the conductive sheet can occupy small space in the housing, to connect the conductive pillar to the housing. In addition, disposing the conductive sheet as an elastic sheet may improve contact reliability and assembling convenience.

In the foregoing embodiment, a surface and a shape of the conductive pillar may also be in a plurality of forms. For example, an outer surface of the conductive pillar may be disposed as a smooth surface, as a knurl surface, or in a drum shape. The shape of the conductive pillar may be a linear shape or an S-shape. When the conductive pillar is disposed in a non-linear shape, the conductive pillar is not in contact with a side wall of the positioning hole, and the conductive pillar can be connected to the conductive sheet, provided that the conductive pillar fits with the inner ring of the conductive bearing through interference.

When the positioning hole is disposed, the positioning hole may be disposed as a through hole or a blind hole. When the positioning hole is a through hole, a blocking member may be further disposed on a side of the conductive bearing that faces away from the conductive sheet, and an outer surface of the blocking member abuts on an inner wall of the positioning hole on the output shaft. In addition, to improve stability of a connection between the blocking member and the positioning hole on the output shaft, the blocking member may fit with the positioning hole on the output shaft through interference. With disposition of the blocking member, lubricating oil that is used to lubricate the output shaft and another transmission component does not flow from the positioning hole on the output shaft to the conductive bearing. In addition, when the blocking member is specifically disposed, a gap may further exist between the blocking member and the conductive bearing, to prevent the blocking member from driving the inner ring of the conductive bearing to rotate with the output shaft. In addition, when the conductive pillar fits with the inner ring of the conductive bearing through interference, a part of the conductive pillar may pass through the inner ring of the conductive bearing and extend to an end away from the conductive sheet. Spacing the blocking member and the conductive bearing apart may also prevent the blocking member from being in contact with the conductive pillar to drive the conductive pillar to rotate.

It should be noted that the blocking member may alternatively abut on the conductive bearing. In this case, a groove needs to be disposed on a side of the blocking member that faces the conductive bearing, and the groove corresponds to the inner ring of the conductive bearing.

This application further provides a powertrain including the motor as described in the foregoing embodiment, and a transmission mechanism. The transmission mechanism is connected to the output shaft. When a common-mode voltage generated in a running process of the motor passes through the output shaft, accumulated charges may be transferred from the conductive bearing and the conductive component to ground, to output the accumulated charges. Therefore, a bearing configured to support the output shaft is prevented from being electrically corroded, and a service life of the bearing is prolonged.

This application further provides a vehicle, including the motor in the foregoing embodiment. The vehicle that uses the motor runs more stably.

REFERENCE NUMERALS

1: housing; 2: output shaft; 3: bearing; 10: conductive bearing; 11: outer ring; 12: inner ring; 20: conductive component; 21: conductive pillar; 210: groove; 211: pedestal; 212: opening; 213: mounting base; 22: conductive sheet; 220: first connection sheet; 2201: arch-shaped part; 2202: first connection part; 2203: first mounting hole; 221: second connection sheet; 2210: insertion part; 2211: second connection part; 222: connection arm; 2220: second mounting hole; 2221: through hole; 30: load bearing; 40: output shaft; 41: positioning hole; 50: blocking member; 60: housing; 70: end cover; 80: nut.

DESCRIPTION OF EMBODIMENTS

To make objectives, technical solutions/embodiments, and advantages of this application clearer, the following further describes this application in detail with reference to accompanying drawings.

Figure 1:
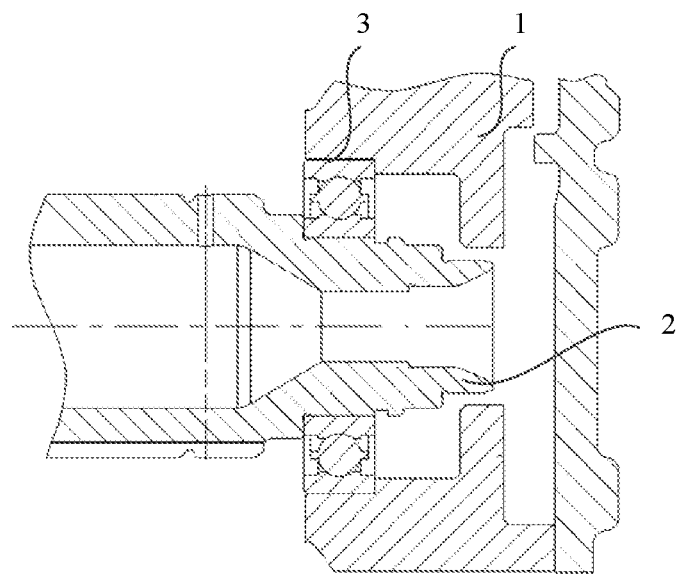
FIG. 1 is a schematic diagram of a structure of a motor according to an embodiment of this application.

A conventional internal combustion engine is usually used as a power source in a conventional fuel vehicle. With continuous innovation of technologies and continuous development of battery technologies, an electric vehicle that uses a motor as a power source is gradually widely used. Referring to FIG. 1, the motor includes a housing 1 and a rotor located in the housing 1, and the rotor is usually positioned in the housing 1 by using a bearing 3. Running of the motor rotor needs to depend on electric energy of a battery. Therefore, charges are inevitably accumulated in the rotor in the motor. When the charges pass through the bearing 3 configured to support an output shaft 2, an undesirable phenomenon such as electrical corrosion easily occurs in the bearing 3, and consequently a service life of the bearing 3 is shortened.

Therefore, the embodiments of this application provide a motor, to release a common-mode voltage at an output shaft by using a conductive bearing and a conductive component, so as to prevent a load bearing from being electrically corroded.

To make the objectives, technical solutions/embodiments, and advantages of this application clearer, with reference to accompanying drawings and specific embodiments, the following further describes in detail the motor provided in this application.

Terms used in the following embodiments are merely intended to describe specific embodiments, but are not intended to limit this application. The terms "one", "a" and "this" of singular forms used in this specification and the appended claims of this application are also intended to include plural forms, unless otherwise specified in the context clearly.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized. The terms "include", "comprise", "have", and their variants all mean "include but are not limited to", unless otherwise specifically emphasized.

Figure 2A:
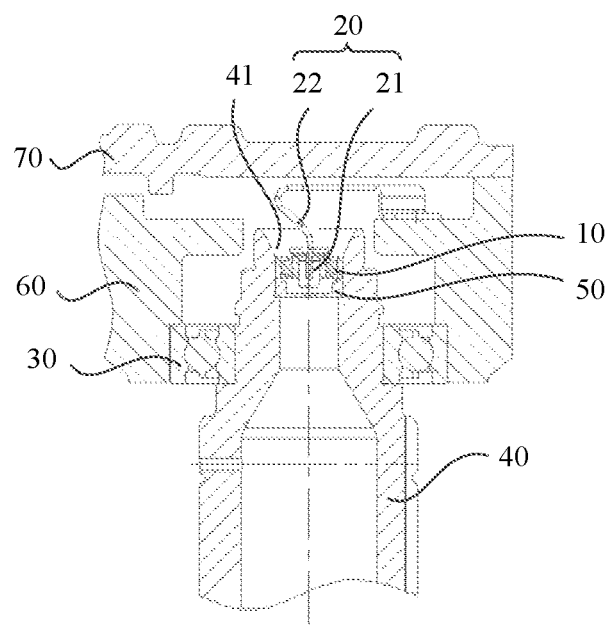
FIG. 2a is a schematic diagram of a structure of a motor according to an embodiment of this application.
Figure 2B:
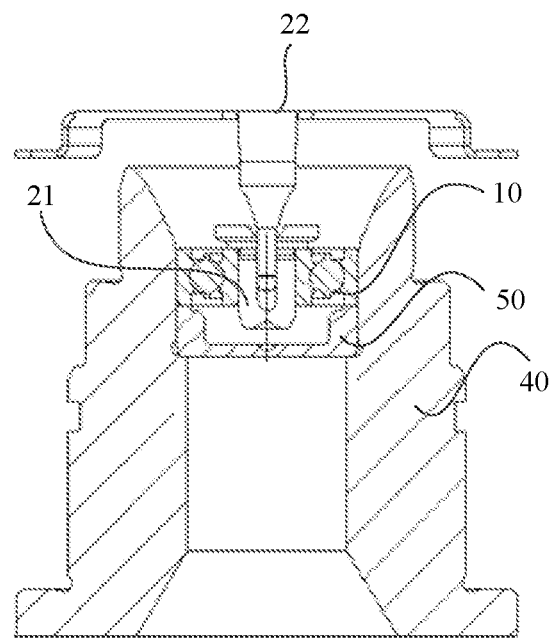
FIG. 2b is a schematic diagram of a structure of a motor whose load bearing, housing, and end cover are not illustrated according to an embodiment of this application.
Figure 2C:
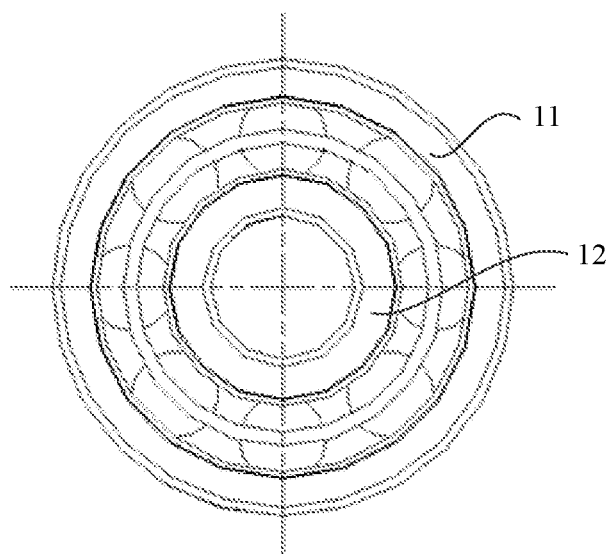
FIG. 2c is a schematic diagram of a structure of a conductive bearing in a motor according to an embodiment of this application.

In an embodiment of the motor provided in this application, referring to FIG. 2a, FIG. 2b, and FIG. 2c, the motor includes a conductive bearing 10, a conductive component 20, a housing 60, and an output shaft 40. The output shaft 40 is disposed in the housing 60. A positioning hole 41 is disposed on an end face of a first end of the output shaft 40, and the positioning hole 41 is disposed coaxially with the output shaft 40. The conductive bearing 10 is disposed in the positioning hole 41, the conductive bearing 10 includes an inner ring 12 and an outer ring 11 (for details, refer to FIG. 2c), and the outer ring 11 of the conductive bearing 10 is fixedly connected to the output shaft 40. One end of the conductive component 20 is fixedly connected to the inner ring 12 of the conductive bearing 10, and the other end is connected to the housing 60. During rotation of the output shaft 40 of the motor, because the conductive component 20 is connected to the inner ring 12 of the conductive bearing 10, when the output shaft 40 drives the outer ring 11 of the conductive bearing 10 to rotate, the inner ring 12 of the conductive bearing 10 does not rotate with rotation of the outer ring 11 of the conductive bearing 10. Therefore, the conductive component 20 in the motor remains still relative to the output shaft 40, and it is ensured that the output shaft 40, the conductive bearing 10, and the conductive component 20 remain connected to each other. In this way, when a common-mode voltage generated during running of a motor rotor in the motor passes through the output shaft 40, accumulated charges may be transferred from the conductive bearing 10 to the conductive component 20, and then transferred from the conductive component 20 to ground. Therefore, a bearing configured to support the output shaft 40 can be prevented from being electrically corroded by the charges accumulated due to the common-mode voltage, to prolong a service life of the bearing configured to support the output shaft 40.

It should be noted that the output shaft 40 may be positioned in the housing 60 by using a load bearing 30, and a resistance of the load bearing 30 is greater than a total sum of resistances of the conductive bearing 10 and the conductive component 20. Therefore, the charges accumulated in a running process of the motor are output by using the conductive bearing 10 and the conductive component 20 that have a smaller sum of resistances, to prevent the load bearing 30 from being electrically corroded.

In an embodiment, the conductive component 20 may include a conductive pillar 21 and a conductive sheet 22. The conductive pillar 21 may be an integral structure, or one end of the conductive pillar 21 is connected to the inner ring 12 of the conductive bearing 10, the other end of the conductive pillar 21 is connected to the conductive sheet 22, and the conductive sheet 22 is connected to the housing 60. When the motor works, the output shaft 40 may drive the outer ring 11, that is of the conductive bearing 10 and that fits with the output shaft 40, to rotate, and the inner ring 12 of the conductive bearing 10 is still relative to the outer ring 11 of the conductive bearing 10. Therefore, the conductive pillar 21 and the conductive sheet 22 connected to the conductive pillar 21 do not rotate with rotation of the outer ring 11 of the conductive bearing 10, and mounting stability of the conductive pillar 21 and the conductive sheet 22 is ensured. In this way, when the common-mode voltage generated during running of the motor rotor passes through the output shaft 40, the accumulated charges may be transferred from the conductive bearing 10 to the conductive pillar 21, and then transferred from the conductive sheet 22 to the housing 60 for grounding, to implement charge output, and prevent the load bearing 30 from being electrically corroded.

It should be noted that, in an assembling process, first, the conductive bearing 10 may be mounted in the positioning hole 41 on the output shaft 40. When the conductive bearing 10 fits with the positioning hole 41 on the output shaft 40, an outer diameter of the outer ring 11 of the conductive bearing 10 may be greater than an inner diameter of the positioning hole 41 on the output shaft 40. Therefore, interference fitting is implemented between the conductive bearing 10 and the positioning hole 41 on the output shaft 40, to prevent sliding friction from occurring between the conductive bearing 10 and the output shaft 40 due to slipping, and improve stability of a connection between the conductive bearing 10 and the output shaft 40. Alternatively, when the conductive bearing 10 fits with the positioning hole 41 on the output shaft 40, the outer ring 11 of the conductive bearing 10 may fit with the positioning hole 41 on the output shaft 40 through interference. In addition, when the conductive pillar 21 fits with the inner ring 12 of the conductive bearing 10, an outer diameter of a part of the conductive pillar 21 that fits with the inner ring 12 of the conductive bearing 10 is greater than an inner diameter of the inner ring 12 of the conductive bearing 10, and the part of conductive pillar 21 fits with the inner ring 12 of the conductive bearing 10 through interference. Therefore, the conductive pillar 21 can always be in contact with the conductive bearing 10, to ensure that the charges can be transferred from the conductive bearing 10 to the conductive pillar 21. The conductive pillar 21 and the housing 60 may be connected to each other by using the conductive sheet 22, so that a current between the output shaft 40 and the housing 60 is conducted, to eliminate the common-mode voltage generated at the output shaft 40. The conductive sheet 22 is connected to an outer side of the housing 60. After the conductive sheet 22 is connected to the housing 60, an end cover 70 of the motor is mounted on the outer side of the housing 60 to cover the conductive sheet 22. This manner can improve mounting convenience and avoid blind assembling.

Figure 3:
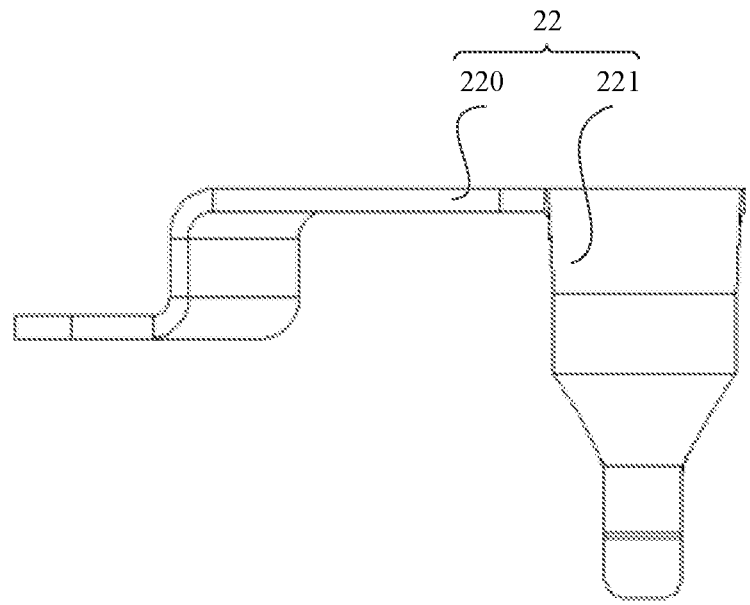
FIG. 3 is a schematic diagram of a structure of a conductive sheet in a motor according to an embodiment of this application.

In the foregoing embodiment, referring to FIG. 3, the conductive sheet 22 may have a plurality of forms. For example, the conductive sheet 22 may include one first connection sheet 220 and one second connection sheet 221. One end of the second connection sheet 221 is connected to the conductive pillar 21, the other end of the second connection sheet 221 is connected to the first connection sheet 220, and the first connection sheet 220 can be connected to the housing 60. In this case, the charges accumulated in the running process of the motor may flow to the housing 60 in a direction from the output shaft to the conductive bearing 10, the conductive pillar 21, the second connection sheet 221, and the first connection sheet 220, to eliminate the common-mode voltage generated in the running process of the motor.

Figure 4:
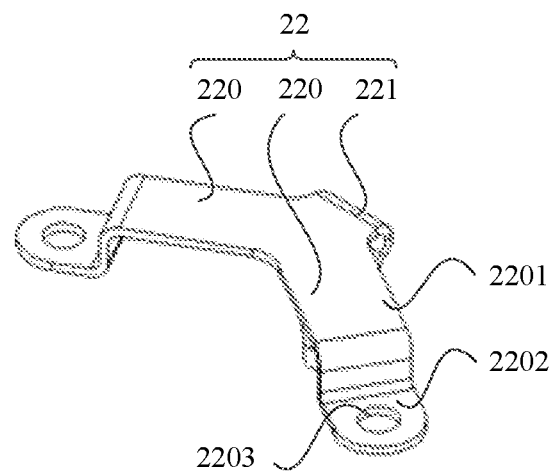
FIG. 4 is a schematic diagram of another structure of a conductive sheet in a motor according to an embodiment of this application.

To improve stability of a connection between the conductive sheet 22 and the housing 60, referring to FIG. 4, the conductive sheet 22 may alternatively include two first connection sheets 220. When there are two first connection sheets 220, the two first connection sheets 220 are connected to each other, and both of the two first connection sheets 220 may be connected to the housing 60. The second connection sheet 221 may be connected to a part at which the two first connection sheets 220 are connected, and an end of the second connection sheet 221 that is away from the two first connection sheets 220 extends to a position of the conductive pillar 21, and remains electrically connected to the conductive pillar 21. The two first connection sheets 220 may be disposed at an angle, so that the two first connection sheets 220 and the housing 60 are disposed in a triangle, to improve stability of the connection between the conductive sheet 22 and the housing 60. In this case, the charges accumulated in the running process of the motor may flow from the output shaft 40 to the conductive bearing 10, the conductive pillar 21, and the second connection sheet 221, and then flow from the two first connection sheets 220 to the housing 60, to eliminate the common-mode voltage generated in the running process of the motor. In this way, when one first connection sheet 220 in the two first connection sheets 220 is broken or disconnected from the housing 60, the other first connection sheet 220 can still keep the conductive pillar 21 and the housing 60 connected to each other. This can prolong a service life of the motor and can reduce maintenance costs.

It should be noted that, when the conductive sheet 22 is disposed, there may be three or more first connection sheets 220. A larger quantity of first connection sheets 220 indicates higher stability of the connection between the conductive sheet 22 and the housing 60. A specific quantity of first connection sheets 220 for use needs to be adjusted based on specific space inside the housing 60 and a use status. Still referring to FIG. 4, when the first connection sheet 220 is disposed, the first connection sheet 220 may include an arch-shaped part 2201 and a first connection part 2202. The first connection part 2202 may be connected to the housing 60 in a manner of welding, a bolt, elastic connection, or abutting. When the first connection part 2202 is connected to the housing 60 by using a bolt, at least one first mounting hole 2203 may be disposed on the first connection part 2202, and the bolt passes through the first mounting hole 2203 to fasten the first connection part 2202 to the housing 60. One end of the arch-shaped part 2201 is connected to the first connection part 2202, and the other end of the arch-shaped part 2201 is connected to the second connection sheet 221. With disposition of the arch-shaped part 2201, when the conductive sheet 22 is mounted on the housing 60, the conductive sheet 22 can be adapted to the housing 60 with different shapes. In addition, with disposition of the arch-shaped part 2201, large deformation can also be generated when the first connection sheet 220 is connected to the housing 60.

There may be a plurality of manners of connecting the first connection sheet 220 and the second connection sheet 221. For example, the first connection sheet 220 and the second connection sheet 221 may be integrally disposed, or the first connection sheet 220 and the second connection sheet 221 may be connected by using a bolt and a nut. In other words, a first connection hole that fits with the second connection sheet 221 is further disposed on the first connection sheet 220, a second connection hole that fits with the first connection sheet 220 is disposed on the second connection sheet 221, and the bolt passes through the second connection hole and the first connection hole to connect the second connection sheet 221 and the first connection sheet 220.

Figure 5:
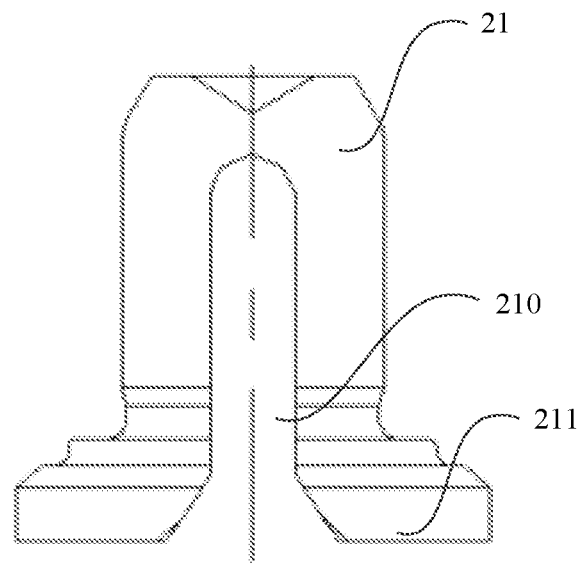
FIG. 5 is a schematic diagram of a structure of a conductive pillar in a motor according to an embodiment of this application.
Figure 6:
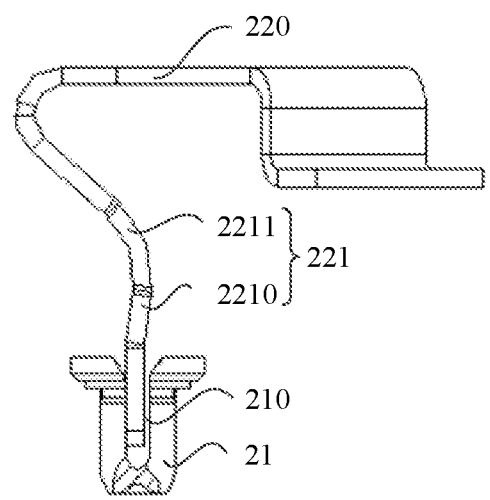
FIG. 6 is a schematic diagram of a structure in which a conductive pillar and a conductive sheet in a motor fit with each other according to an embodiment of this application.

In the foregoing embodiment, referring to FIG. 4 and FIG. 5, to conveniently connect the conductive pillar 21 to the second connection sheet 221, a groove 210 may be disposed on the conductive pillar 21. The groove 210 may be facing a side of the first connection sheet 220. In addition, on a side of the groove 210 that faces the first connection sheet 220, a pedestal 211 is further disposed on the conductive pillar 21. Therefore, when the conductive pillar 21 fits with the conductive bearing 10 through interference, the pedestal 211 can abut on a side of the conductive bearing 10 that faces the first connection sheet 220, to improve stability of fitting between the conductive pillar 21 and the conductive bearing 10. To enable the second connection sheet 221 to be conveniently inserted into the groove 210 on the conductive pillar 21, referring to FIG. 6, the second connection sheet 221 may include an insertion part 2210 inserted into the groove 210 and a second connection part 2211 connected to the insertion part 2210. One end of the second connection part 2211 is connected to the first connection sheet 220, and the other end of the second connection part 2211 is connected to the insertion part 2210. When the conductive sheet 22 is mounted on the housing 60 and is inserted into the other end of the conductive pillar 21, the insertion part 2210 and the second connection part 2211 may be disposed at an angle. Therefore, the insertion part 2210 can be quickly inserted into the groove 210, and the insertion part 2210 can remain being in contact with an inner wall of the groove 210. This ensures that the conductive pillar 21 can transfer the charges to the insertion part 2210, so that the charges are transferred from the second connection part 2211 to the first connection sheet 220. With disposition of the groove 210 on the conductive pillar 21, impacts such as an assembling error and a position error of the conductive sheet 22 can be further reduced, to improve conductive reliability and reduce manufacturing costs. In addition, disposition of the groove 210 can further implement buffering and vibration absorption functions.

It should be noted that, when a strength condition of the conductive pillar 21 is met, a plurality of grooves 210 may be disposed (not shown in FIG. 6), and the plurality of grooves 210 are distributed at intervals, so that the insertion part 2210 can fit with the conductive pillar 21 more quickly. The groove 210 may penetrate through the conductive pillar 21 in a radial direction of the conductive pillar 21, and a part of the groove 210 may extend to a position at which the conductive pillar 21 fits with the inner ring 12 of the conductive bearing 10. In this case, when the conductive pillar 21 fits with the inner ring 12 of the conductive bearing 10, the conductive pillar 21 located on two sides of the groove 210 may be deformed towards a center of the conductive pillar 21. Therefore, when the conductive pillar 21 fits with the inner ring 12 of the conductive bearing 10 through interference, interference force exerted on the inner ring 12 of the conductive bearing 10 is reduced, and the conductive bearing 10 is prevented from being damaged. In addition, the groove 210 may be in a cavity form, and an opening of the groove 210 faces a side of the second connection sheet 221, so that the second connection sheet 221 can be clamped in the groove 210.

Figure 7:
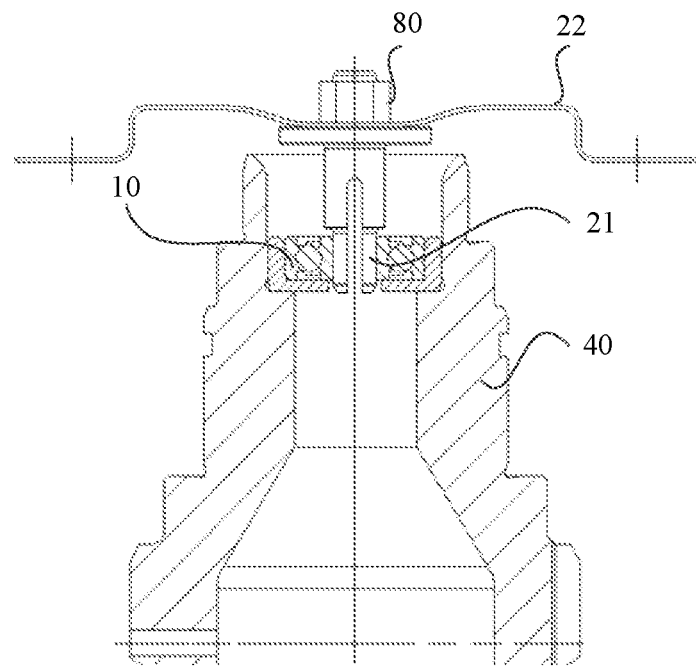
FIG. 7 is a schematic diagram of another structure of a motor whose load bearing, housing, and end cover are not illustrated according to an embodiment of this application.

In an embodiment, the conductive sheet 22 may be further connected to the conductive pillar 21 in the following manner: A through hole that fits with the conductive pillar 21 is directly disposed on the conductive sheet 22, a thread is disposed on an outer surface of an end of the conductive pillar 21 that is away from the conductive bearing 10, a mounting base is fixedly disposed at a position near the thread, and the mounting base may abut on the conductive sheet 22. In an assembling process, a part of the conductive pillar 21 that is provided with the thread passes through the through hole, and a nut is connected to the threaded part of the conductive pillar and abuts on the conductive sheet 22 to press the conductive sheet 22 against a position of the mounting base, so that the conductive sheet 22 remains electrically connected to the conductive pillar 21. Alternatively, referring to FIG. 7, a through hole that fits with the conductive pillar 21 is disposed on the conductive sheet 22. An end of the conductive pillar 21 that is away from the conductive bearing 10 may pass through the through hole, a part of the conductive pillar 21 that passes through the through hole fits with a nut 80 through interference, and the nut 80 is in contact with the conductive sheet 22, so that the conductive pillar 21 remains electrically connected to the conductive sheet 22. In this case, the charges accumulated in the running process of the motor may flow to the housing 60 in a direction from the output shaft 40 to the conductive bearing 10, the conductive pillar 21, and the conductive sheet 22, to eliminate the common-mode voltage generated in the running process of the motor.

Figure 8:
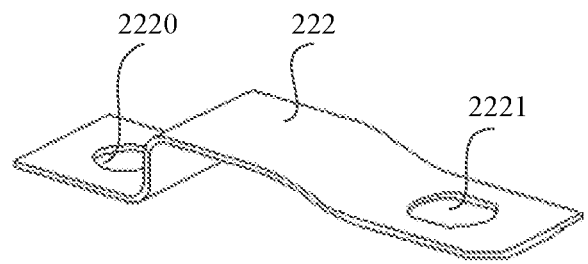
FIG. 8 is a schematic diagram of another structure of a conductive sheet in a motor according to an embodiment of this application.

In the foregoing embodiment, referring to FIG. 8, the conductive sheet 22 may include at least one connection arm 222. A through hole 2221 that fits with the conductive pillar 21 is disposed on one end of the connection arm 222, and a second mounting hole 2220 configured to be connected to the housing 60 is disposed on the other end of the connection arm 222. A bolt passes through the second mounting hole 2220 to connect the connection arm 222 to the housing 60. During a disposition, there may be a plurality of second mounting holes 2220, so that the connection arm 222 is mounted on the housing 60. In addition, a plurality of through holes 2221 may be disposed, so that the conductive pillar 21 is connected to the connection arm 222.

Figure 9:
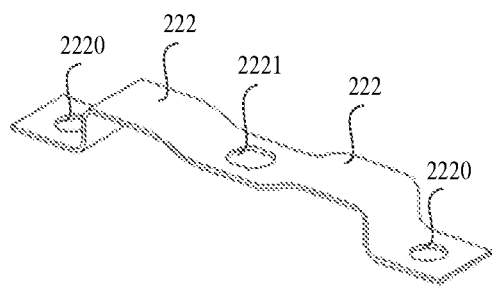
FIG. 9 is a schematic diagram of another structure of a conductive sheet in a motor according to an embodiment of this application.

When the conductive sheet 22 is disposed, referring to FIG. 9, the conductive sheet 22 may alternatively include two connection arms 222. A projection of the two connection arms 222 on a horizontal plane may be a rectangle, or may be a V-shape (not shown in FIG. 9). A through hole 2221 may be disposed at a position of a part at which the two connection arms 222 are connected, or may be disposed on one connection arm 222 in the two connection arms 222, or a through hole 2221 is disposed on each of the two connection arms 222. A second mounting hole 2220 may be disposed on each of the two connection arms 222, and the second mounting hole 2220 may be disposed at an end part of the connection arm 222. Two bolts and the two second mounting holes 2220 connect the two connection arms 222 to the housing 60, so that the conductive sheet 22 can be more stably connected to the housing 60.

In an embodiment, the conductive sheet may alternatively include three, four, or more connection arms 222 (not shown in FIG. 9). When there are three connection arms 222, the three connection arms 222 may be disposed in a Y-shape or a T-shape. A through hole 2221 may be disposed at a position of a part at which the three connection arms 222 are connected, or a through hole 2221 may be disposed on each of the three connection arms 222, or may be disposed on any one of the three connection arms 222. In this way, a position precision requirement on the conductive pillar 21 may be reduced. A second mounting hole 2220 may also be disposed on each of the three connection arms 222, and bolts may pass through the second mounting holes 2220 to fasten the three connection arms to the housing 60.

In addition, when the conductive sheet 22 includes at least two connection arms 222, the at least two connection arms 222 may be integrally disposed, or may be separately disposed. When a separate structure is used for the at least two connection arms 222, the at least two connection arms 222 may be connected by using a bolt. At a position at which the at least two connection arms 222 are connected to each other, a through hole is disposed on each connection arm, the conductive pillar 21 passes through the two through holes on the two connection arms 222, and then the two connection arms 222 are fastened to the conductive pillar 21 by using a nut.

Figure 10:
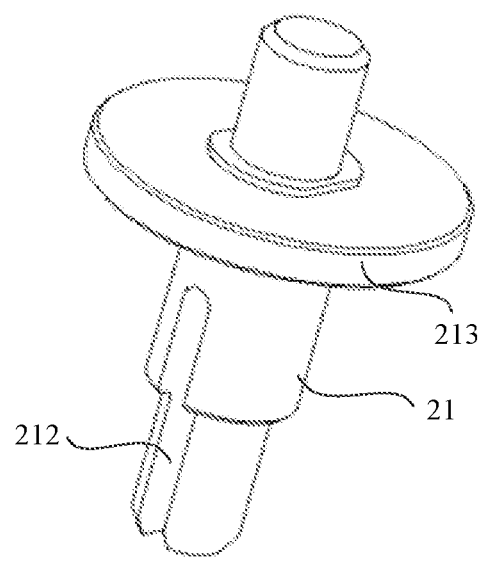
FIG. 10 is a schematic diagram of another structure of a conductive pillar in a motor according to an embodiment of this application.
Figure 11:
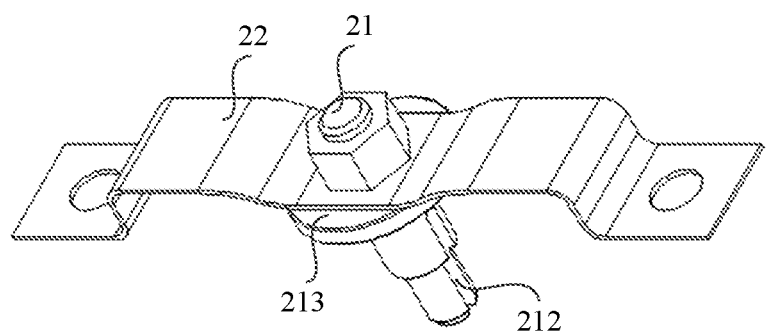
FIG. 11 is a schematic diagram of another structure in which a conductive pillar and a conductive sheet in a motor fit with each other according to an embodiment of this application.

In the foregoing embodiment, referring to FIG. 10 and FIG. 11, when the conductive pillar 21 is disposed, an opening 212 is disposed on a side of the conductive pillar 21 that faces the conductive bearing, and a mounting base 213 is further disposed on the conductive pillar 21. The opening 212 extends to an end of the conductive pillar 21 that is provided with the mounting base 213. A part of the conductive pillar 21 that is located at the mounting base 213 and that is away from the opening may also be cylindrical. One nut fits with a part of the conductive pillar 21 that is away from the opening 212 and that passes through the through hole on the conductive sheet 22 through interference, so that the conductive pillar 21 can be connected to the conductive sheet 22. With disposition of the opening 212, when the conductive pillar 21 fits with the conductive bearing through interference, extrusion force exerted on the inner ring of the conductive bearing can be reduced, to ensure that the conductive pillar 21 can be in contact with the inner ring of the conductive bearing, and further reduce a strength requirement on the conductive bearing. There may be a plurality of openings 212, extension directions of the plurality of openings 212 are the same, and depths (lengths by which the openings extend to the end of the conductive pillar 21 that is provided with the mounting base 213) of the plurality of openings 212 may be different or the same.

In an embodiment, when the conductive pillar 21 is disposed, an outer surface of the conductive pillar 21 may be disposed as a smooth surface, so that the conductive pillar 21 is inserted into the inner ring 12 of the conductive bearing 10 to fit with the conductive bearing 10. Alternatively, an outer surface of the conductive pillar 21 may be disposed as a knurl surface (not shown in FIG. 10 and FIG. 11). Therefore, after the conductive pillar 21 fits with the inner ring 12 of the conductive bearing 10, friction between the conductive pillar 21 and the inner ring 12 of the conductive bearing 10 increases, to reduce a probability of relative rotation between the conductive pillar 21 and the inner ring 12 of the conductive bearing 10. Alternatively, an outer surface of the conductive pillar 21 may be disposed in a drum shape (not shown in FIG. 10 and FIG. 11). In this case, when the conductive pillar 21 fits with the inner ring 12 of the conductive bearing 10, a drum-shaped part of the conductive pillar 21 may be adapted to the inner ring 12 of the conductive bearing 10, so that interference fitting is implemented between the conductive pillar 21 and the conductive bearing 10. In addition, the outer surface of the conductive pillar 21 may be in a plurality of forms, provided that the conductive pillar 21 can remain being in contact with the inner ring 12 of the conductive bearing 10. The forms are not enumerated herein.

In the foregoing embodiment, the conductive sheet 22 may be disposed as an elastic sheet. Therefore, when the conductive sheet 22 is connected to the housing 60 and the conductive pillar 21, the conductive sheet 22 can occupy small space in the housing 60, to connect the conductive pillar 21 to the housing 60. In addition, disposing the conductive sheet 22 as an elastic sheet may reduce a difficulty of mounting the output shaft 40 on the motor and improve assembling convenience.

In the foregoing embodiment, the positioning hole may be a blind hole or a through hole. When the positioning hole is a through hole, still referring to FIG. 2a, in an actual working process of the motor, the output shaft 40 and another transmission component need to be lubricated by using lubricating oil. To prevent the lubricating oil from flowing from the positioning hole on the output shaft 40 to the conductive bearing 10, a blocking member 50 may be further disposed in the positioning hole on the output shaft 40. The blocking member 50 is configured to block the lubricating oil inside the output shaft 40, to ensure that the lubricating oil does not flow to the conductive bearing 10. In addition, the blocking member 50 rotates with rotation of the output shaft 40. Therefore, when the blocking member 50 is disposed, the blocking member 50 and the conductive bearing 10 may be spaced apart, to prevent the blocking member 10 from driving the inner ring 12 of the conductive bearing 10 to rotate to drive the conductive pillar 21 that fits with the inner ring 12 of the conductive bearing 10 through interference and the conductive sheet 22 connected to the conductive pillar 21 to rotate.

It should be noted that the conductive pillar 21 fits with the inner ring 12 of the conductive bearing 10 through interference, and the conductive pillar 21 may extend to an end of the blocking member 50 by a distance. Therefore, an interval between the blocking member 50 and the conductive bearing 10 also needs to be greater than the distance by which the conductive pillar 21 extends, to prevent the blocking member 50 from being in contact with the conductive pillar 21 to drive the conductive pillar 21 to rotate.

Based on a structure of the motor described above, this application further provides a powertrain, including a transmission mechanism and the motor in the foregoing technical solution. The transmission mechanism is connected to the output shaft included in the motor described above. When a common-mode voltage generated in a running process of the motor passes through the output shaft, accumulated charges may be transferred from the conductive bearing 10 and the conductive component 20 to ground, to output the accumulated charges. Therefore, a bearing configured to support the output shaft 40 is prevented from being electrically corroded, and a service life of the bearing is prolonged.

Based on a specific structure of the motor described above, this application further provides a vehicle, including the motor in the foregoing solution. The vehicle that uses the motor runs more stably.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A motor, comprising:
  a housing;
  an output shaft;
  a conductive bearing; and
  a conductive component, comprising:
    a conductive pillar; and
    a conductive sheet;
  wherein the output shaft is positioned in the housing, and includes a positioning hole disposed coaxially with the output shaft and on an end face of a first end of the output shaft;
  wherein the conductive bearing is disposed in the positioning hole, and comprises an inner ring, and an outer ring that is fixedly connected to the output shaft;
  wherein the conductive sheet comprises a first connection sheet and a second connection sheet, one end of the conductive pillar is fixedly connected to the inner ring of the conductive bearing, and the second connection sheet is clamped to a groove disposed on the other end of the conductive pillar; and
  wherein one end of the conductive component is fixedly connected to the inner ring of the conductive bearing, and the other end is connected to the housing.

2. The motor according to claim 1, wherein the output shaft is positioned in the housing by using a load bearing with a resistance o that is greater than a total sum of resistances of the conductive bearing and the conductive component.

3. The motor according to claim 1, wherein the first connection sheet and the second connection sheet are an integral structure, or connected, wherein the first connection sheet is connected to the housing.

4. The motor according to claim 3, wherein the first connection sheet comprises an arch-shaped part and a first connection part that is connected to one end of the arch-shaped part, wherein a first mounting hole that fits with the housing is disposed on the first connection part, and wherein the other end of the arch-shaped part is connected to the second connection sheet.

5. The motor according to claim 3, wherein the second connection sheet comprises an insertion part inserted into the other end of the conductive pillar and a connection part that connects the insertion part to the first connection sheet.

6. The motor according to claim 3, wherein the first connection sheet is one of two first connection sheets that are connected to the housing and to the second connection sheet.

7. The motor according to claim 6, wherein the two first connection sheets and the second connection sheet are an integral structure.

8. The motor according to claim 1, wherein a through hole is disposed on the conductive sheet, and the conductive pillar passes through the through hole and is connected to the conductive sheet by using a nut.

9. The motor according to claim 8, wherein an opening is disposed on an end of the conductive pillar that faces the conductive bearing, and extends in a direction of the conductive sheet.

10. The motor according to claim 8, wherein a second mounting hole is disposed on the conductive sheet, and is configured to fit with the housing.

11. The motor according to claim 1, wherein the motor further comprises an end cover that is fastened to an end of the housing, and wherein the conductive component is located between the end cover and the housing.

12. The motor according to claim 1, wherein the conductive sheet is an elastic sheet.

13. The motor according to claim 1, wherein the positioning hole is a through hole or a blind hole.

14. The motor according to claim 13, wherein when the positioning hole is a through hole, the motor further comprises a blocking member that is disposed in the through hole and located on a side of the conductive bearing that faces away from the conductive sheet.

15. A powertrain, comprising:
a transmission mechanism; and
a motor that comprises a housing, an output shaft, a conductive bearing, and a conductive component;
wherein the output shaft is positioned in the housing, and includes a positioning hole disposed coaxially with the output shaft and on an end face of a first end of the output shaft; wherein the conductive bearing is disposed in the positioning hole and comprises an inner ring, and an outer ring that is fixedly connected to the output shaft;
wherein one end of the conductive component is fixedly connected to the inner ring of the conductive bearing, and the other end is connected to the housing, the conductive component comprises a conductive pillar and a conductive sheet, the conductive sheet comprises a first connection sheet and a second connection sheet, one end of the conductive pillar is fixedly connected to the inner ring of the conductive bearing, and the second connection sheet is clamped to a groove disposed on the other end of the conductive pillar; and
wherein the transmission mechanism is connected to the output shaft.

16. A vehicle, comprising:
a motor, wherein the motor comprises a housing, an output shaft, a conductive bearing, and a conductive component;
wherein the output shaft is positioned in the housing, and includes a positioning hole that is disposed coaxially with the output shaft and on an end face of a first end of the output shaft;
wherein the conductive bearing is disposed in the positioning hole, and comprises an inner ring, and an outer ring that is fixedly connected to the output shaft; and
wherein one end of the conductive component is fixedly connected to the inner ring of the conductive bearing, and the other end is connected to the housing;
wherein the conductive component comprises a conductive pillar and a conductive sheet, the conductive sheet comprises a first connection sheet and a second connection sheet, wherein one end of the conductive pillar is fixedly connected to the inner ring of the conductive bearing, and the second connection sheet is clamped to a groove disposed on the other end of the conductive pillar.

* * * * *